US008645942B2

(12) United States Patent
Maj (10) Patent No.: US 8,645,942 B2
(45) Date of Patent: Feb. 4, 2014

(54) SOFTWARE UPDATE SYNDICATION

(75) Inventor: Artur Maj, Skarzysko Kamlenna (PL)

(73) Assignee: Oracle International Corporation, Redwood Shores, CA (US)

( * ) Notice: Subject to any disclaimer, the term of this patent is extended or adjusted under 35 U.S.C. 154(b) by 1401 days.

(21) Appl. No.: 11/577,483

(22) PCT Filed: May 26, 2006

(86) PCT No.: PCT/US2006/020577
§ 371 (c)(1),
(2), (4) Date: Apr. 18, 2007

(87) PCT Pub. No.: WO2007/139539
PCT Pub. Date: Dec. 6, 2007

(65) Prior Publication Data
US 2009/0055817 A1   Feb. 26, 2009

(51) Int. Cl.
*G06F 9/44* (2006.01)
(52) U.S. Cl.
USPC .......................................................... 717/172
(58) Field of Classification Search
USPC .................................. 717/171–173, 176–178
See application file for complete search history.

(56) References Cited

U.S. PATENT DOCUMENTS

| 5,960,204 | A * | 9/1999 | Yinger et al. ................. 717/176 |
| 6,151,643 | A * | 11/2000 | Cheng et al. ...................... 710/36 |
| 6,202,207 | B1 * | 3/2001 | Donohue ........................ 717/173 |
| 6,938,109 | B1 * | 8/2005 | Sliger et al. ...................... 710/68 |
| 7,181,739 | B1 * | 2/2007 | Harral et al. ................... 717/176 |
| 7,802,246 | B1 * | 9/2010 | Kennedy et al. ............... 717/173 |
| 2002/0184619 | A1 * | 12/2002 | Meyerson ....................... 717/173 |
| 2002/0198972 | A1 | 12/2002 | Babbitt et al. |
| 2003/0195951 | A1 * | 10/2003 | Wittel et al. ................... 709/220 |
| 2004/0117787 | A1 * | 6/2004 | Sowa et al. .................... 717/174 |
| 2005/0039178 | A1 * | 2/2005 | Marolia et al. ................ 717/168 |
| 2005/0216906 | A1 * | 9/2005 | Shahindoust et al. ........ 717/171 |
| 2005/0257208 | A1 * | 11/2005 | Blumfield et al. ............. 717/168 |
| 2006/0064589 | A1 * | 3/2006 | Taniguchi et al. ............. 713/170 |
| 2006/0080651 | A1 * | 4/2006 | Gupta et al. ................... 717/169 |
| 2006/0136923 | A1 * | 6/2006 | Kahn et al. .................... 718/100 |
| 2006/0200814 | A1 * | 9/2006 | Kontinen et al. ............. 717/168 |
| 2007/0234331 | A1 * | 10/2007 | Schow et al. .................. 717/168 |
| 2007/0240152 | A1 * | 10/2007 | Li et al. ......................... 717/174 |

OTHER PUBLICATIONS

Artur Maj, *Software Update Syndication*, Oracle EMEA Mobile and Wireless Center of Expertise, Dec. 2005, 13s pages.

* cited by examiner

*Primary Examiner* — Anna Deng
(74) *Attorney, Agent, or Firm* — Kilpatrick Townsend & Stockton LLP (57) ABSTRACT

Methods, systems, and machine-readable media are disclosed for distributing software packages to one or more clients. Providing software to one or more clients can comprise generating a software package and publishing the package to a media accessible by the one or more clients. A description of the software package can also be generated and published. The description can identify the software package, contents of the software package, and uses of the software package. A client can obtain software packages from one or more servers by reading the description of software packages available on the one or more servers. A determination can be made as to whether the description indicates at least one of the software packages is available for the client. In response to determining at least one of the software packages is available for the client, the software package can be downloaded and installed on the client.

30 Claims, 8 Drawing Sheets

| Client Specification | |
|---|---|
| Software Company | 505 |
| Software Company's Certificate | 510 |
| Software Name | 515 |
| Software Version | 520 |
| Supported Language(s) | 525 |
| Supported Operating System(s) | 530 |
| Installed Updates | 535 |
| URI to Description File | 540 |
| Client Certificate | 545 |

SOFTWARE UPDATE SYNDICATION

BACKGROUND OF THE INVENTION

Embodiments of the present invention relate generally to the distribution of software and more particularly to distributing software packages to one or more clients from one or more servers based on information about the package and the client.

Distribution of software such as updates, patches, fixes, upgrades, etc., is a problem for by almost every software company in the world. This problem is usually addressed by using one or a combination of methods. For example, software updates can be distributed via removable media such as Compact Disks (CDs), Digital Video Disks (DVDs), tapes, diskettes, etc. In other cases, software, updates, etc. can be published on a software company's systems accessible from the Internet (e.g., on web servers, FTP servers, etc.) that allows users to download the software by using regular web clients (e.g., web browsers, ftp clients, etc.). In yet other cases, a custom software in a client-server architecture can be used to automatically download updates or other software from a software company's servers, via the Internet or other media.

However, all of these methods have some significant drawbacks. For example, distributing software via a removable media is slow and expensive, especially because of the costs of media and the costs of delivery. Downloading updates from World Wide Web (WWW) or File Transfer Protocol (FTP) sites is currently inconvenient to use, mainly because users need to manually visit multiple web or FTP servers from time to time to check if updates are released. This method is also time consuming, especially when the user has many software packages installed from multiple vendors. Custom software that checks for updates via the Internet or other media can be inconvenient to configure and manage. In this method, every installed software needs to have its own component for updating, which is problematic when the network configuration changes. If this happens, all update components may need to be configured as well. Furthermore, problems occur in passing through firewalls because such solutions may use proprietary network protocols, which may be not understandable by proxies or firewalls. Additionally, in this kind of solution, the updates are usually not accessible from regular web browsers. So, if there are any problems with the client software, users are not able to download the updates at all.

Security of all above solutions may also raise a lot of doubts. End users that use the software and download/install updates may have no way to verify if the software updates are not tampered with by third parties and do not contain viruses, worms, Trojans, spyware, etc. Although, at the moment, some software companies use hash sums and PGP-like signatures, these solutions still do not solve the problem. Single hash algorithms like (Message Digest 5 (MD5) and Secure Hash Algorithm (SHA) do not include electronic signatures of the software company. On the other hand, PGP-like signatures seem to be difficult and time-consuming to use and they do not seem to be popular among users. Therefore, end users may have no way to verify the origins of updates or other software.

Furthermore, existing solutions are not compatible with each other, which makes the process of distributing software updates in the corporate environment very difficult to perform in practice. For example, keeping all software on employees' computers up to date etc can be extremely time consuming and difficult. It is also not an easy task to verify on which hosts the updates were successfully installed and on which they were not. As a consequence, end users may use software with known security vulnerabilities that allow intruders or malware software to take control over their machines, leak sensitive or private information to intruders, attack other machines, disturb them in performing their work etc.

Hence, there is a need for methods and systems that allow for secure, automatic downloads of software via a variety of media in a manner that is usable by different software, potentially provided by different entities.

BRIEF SUMMARY OF THE INVENTION

Methods, systems, and machine-readable media are disclosed for distributing software packages to one or more clients from one or more servers. According to one embodiment, a method of providing software to one or more clients can comprise generating a software package for distribution to the one or more clients. Generating the software package can further comprise compressing the software package. In some cases, the method can further comprise appending a signature to the compressed software package, the signature identifying a source of the software package. Furthermore, in some cases, generating the software package can comprise encrypting the software package with a client certificate. The software package can be published to a media accessible by the one or more clients.

A description of the software package can also be generated. The description can identify the software package, contents of the software package, and uses of the software package. In some cases, generating the description of the software package can further comprise appending a signature to the description of the software package, the signature identifying a source of the description. The source of the software package and the source of the description can be different.

The description of the software package can be published to the media accessible by the one or more clients. Publishing the software package can comprise making the software package available via a first web server. Furthermore, publishing the description can comprise making the description available on the first web server or, alternatively, making the description available on a second web server. In yet another example, publishing the software package can comprise writing the software package to a removable media. In such a case, publishing the description of the software package can comprise writing the description to the removable media.

According to one embodiment, the description can comprise any or all of an identifier of an operating system for which the software package is written, an identifier of a language for which the software package is written, an Uniform Resource Identifier (URI) for the software package, as well as other possibilities. For example, the software package can comprise an application or an update of an application. In such a case, the description of the software package can comprise an identifier of an application the software package updates. Furthermore, the description can comprise an identifier of one or more prerequisite updates.

According to one embodiment, the method can further comprise logging a client access of the software package. Logging can comprise recording an identifier of the software package and an identifier of the client.

According to another embodiment, a method of obtaining software by a client from one or more servers can comprise reading a description of one or more software packages available on the one or more servers. The description can identify the software package, contents of the software package, and uses of the software package. In some cases, the description can comprise an Uniform Resource Identifier (URI) for the software package.

A determination can be made as to whether the description indicates at least one of the software packages is available for the client. In some cases, the method can further comprise verifying an origin of the description based on a signature appended to the description. According to one embodiment, determining whether the description indicates at least one of the software packages is available for the client is performed only in response to verifying the description. Determining whether the description indicates at least one of the software packages is available for the client can comprise comparing the description to a specification stored on the client. For example, the description can comprise an identifier of an operating system for which the software package is written, the specification can comprise an indication of an operating system of the client, and determining whether the description indicates at least one of the software packages is available for the client can comprise comparing the identifier of an operating system for which the software package is written in the description with the indication of the operating system of the client in the specification. In another example, the description can comprise an identifier of a language for which the software package is written, the specification can comprise an indication of one or more languages used on the client, and determining whether the description indicates at least one of the software packages is available for the client can comprise comparing the identifier of a language for which the software package is written from the description with the indication of one or more languages used one the client from the specification.

According to one embodiment, the software package can comprise an update of an application. In such a case, the description of the software package can comprise an identifier of an application the software package updates, the specification can comprise an indication of applications installed on the client, and determining whether the description indicates at least one of the software packages is available for the client can comprise comparing the identifier of the application the software package updates from the description and the indication of applications installed on the client from the specification. Additionally or alternatively, the description can further comprise an identifier of one or more prerequisite updates for installing the software package, the specification can comprise an indications of updates installed on the client, and determining whether the description indicates at least one of the software packages is available for the client can comprise comparing the identifier of one or more prerequisite updates from the description with the indications of updates installed on the client from the specification.

In response to determining at least one of the software packages is available for the client, the at least one software package can be downloaded. According to one embodiment, the method can further comprise verifying an origin of the software package based on a signature appended to the software package. In response to verifying the software package, the software package can be installed on the client. In some cases, prior to installing the software package, the software package may be decrypted with, for example, a client certificate. The specification can then be updated to indicate installation of the software package.

According to yet another embodiment, a system can comprise a server. The server can be adapted to generate a software package, publish the software package, generate a description of the software package, where the description identifies the software package, contents of the software package, and uses of the software package, and publish the description of the software package. The system can also include a client communicatively coupled with the server. The client can be adapted to read the description of the software package, determine whether the description indicates the software package is available for the client, and in response to determining the software package is available for the client, download the software package.

In some cases, the server can be further adapted to compress the software package. Additionally or alternatively, the server can be further adapted to append a signature to the compressed software package. In some cases, the server can be additionally or alternatively adapted to append a signature to the description of the software package.

The client can be further adapted to verify an origin of the description based on the signature appended to the description. In such a case, the client can be adapted to determine whether the description indicates the software package is available for the client only in response to verifying the description.

According to one embodiment, the description can comprise an identifier of an operating system for which the software package is written, the specification can comprise an indication of an operating system of the client, and the client can determine whether the description indicates the software package is available for the client by comparing the identifier of an operating system for which the software package is written in the description with the indication of the operating system of the client in the specification. Additionally or alternatively, the description can comprise an identifier of a language for which the software package is written, the specification can comprise and indication of one or more languages used on the client, and the client can determine whether the description indicates the software package is available for the client by comparing the identifier of a language for which the software package is written from the description with the indication of one or more languages used one the client from the specification.

In some cases, the software package can comprise an update of an application. In such a case, the description of the software package can comprise an identifier of an application the software package updates, the specification can comprise an indication of applications installed on the client, and the client can determine whether the description indicates the software package is available for the client by comparing the identifier of the application the software package updates from the description and the indication of applications installed on the client from the specification. Additionally or alternatively, the description can comprise an identifier of one or more prerequisite updates for installing the software package, the specification can comprise an indications of updates installed on the client and the client can determine whether the description indicates the software package is available for the client by comparing the identifier of one or more prerequisite updates from the description with the indications of updates installed on the client from the specification.

According to still another embodiment, a system can comprise a first server adapted to generate a software package, publish the software package, generate a description of the software package, where the description identifies the software package, contents of the software package, and uses of the software package, and publish the description of the software package. A second server can be communicatively coupled with the first server. The second server can be and adapted to read the description of the software package from the first server, determine whether the description indicates the software package is available for one or more of a plurality of clients communicatively coupled with the second server, in response to determining the software package is available for at least one of the plurality of clients, download the software package, publish the software package to a media accessible by the plurality of clients, and publish the description of the software package to the media accessible by the plurality of clients. The system can further comprise a client of the plurality of clients that can be adapted to read the description of the software package from the second server, determine whether the description from the second server indicates the software package is available for the client, and in response to determining the software package is available for the client, download the software package from the second server.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing downloads of software via a variety of media in a manner that is usable by different software, potentially published by different vendors. It should be noted that, while discussed herein with reference to providing software updates, embodiments of the present invention are thought to be useful with distributing any type of software package. For example, embodiments of the present invention are thought to be equally applicable to new application software, add-on applications, templates, forms, schemas, or any other type of software package. Other applications are also contemplated and considered to be within the scope of the present invention.

Embodiments of the present invention allow software companies or other entities to provide and distribute software packages in a secure manner with minimal changes to the IT infrastructure by using popular network protocols such as HyperText Transfer Protocol (HTTP), File Transfer Protocol (FTP), etc. Furthermore, the embodiments allow users to collect software packages from different entities and distribute them from a central place or multiple places as the embodiments are scalable. The embodiments can be performed either online via the Internet and/or an Intranet, or offline by using removable media.

Generally speaking, providing software to one or more clients can comprise generating a software package for distribution to the one or more clients. The software package can be published to a media accessible by the one or more clients. A description of the software package can also be generated. The description can identify the software package, contents of the software package, and uses of the software package. The description of the software package can be published to the media accessible by the one or more clients.

A client can obtain software packages from one or more servers by reading the description of one or more software packages available on the one or more servers. A determination can be made as to whether the description indicates at least one of the software packages is available for the client. Determining whether the description indicates at least one of the software packages is available for the client can comprise comparing the description to a specification stored on the client. In response to determining at least one of the software packages is available for the client, the at least one software package can be downloaded and installed on the client. The specification stored on the client can then be updated to indicate installation of the software package. Additional details of the various embodiments of the present invention will be discussed below.

Figure 1:
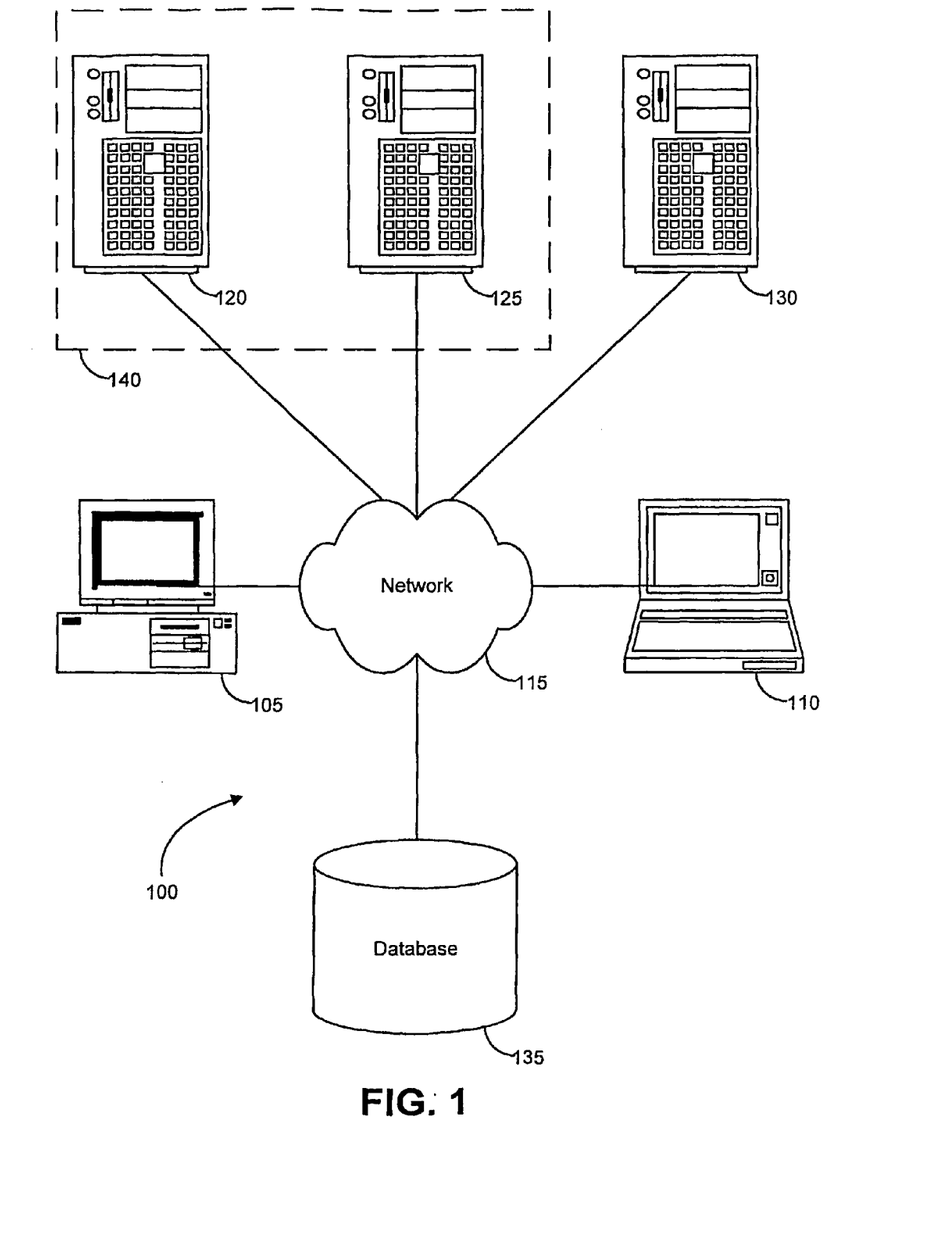
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
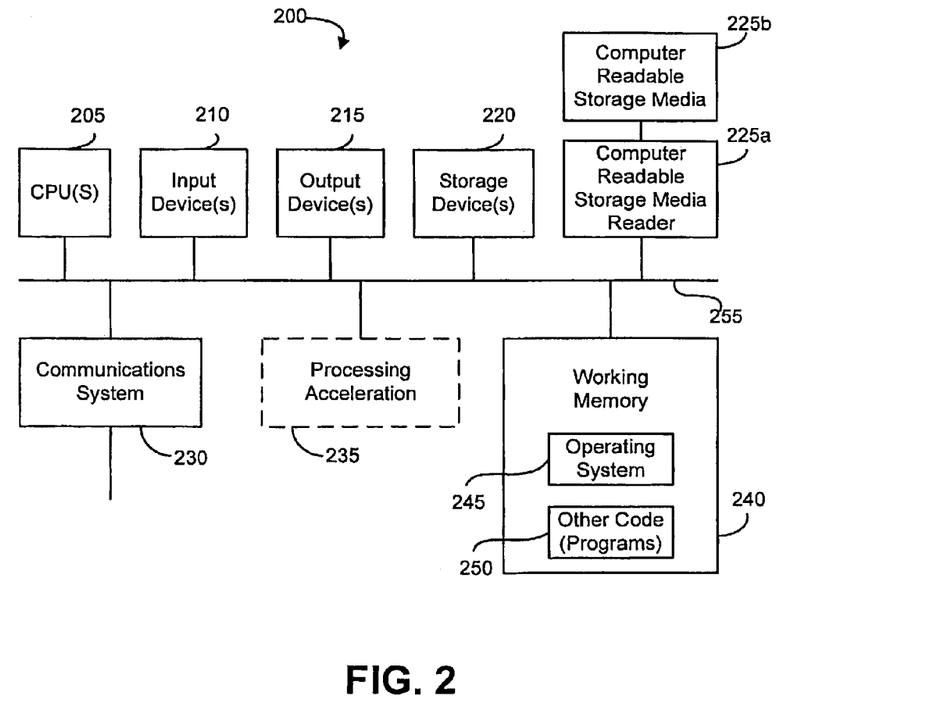
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above such as the server computers or the user computers. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). The application programs may have and/or designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing any or all of the elements of the systems for distributing software packages as described below.

Figure 3:
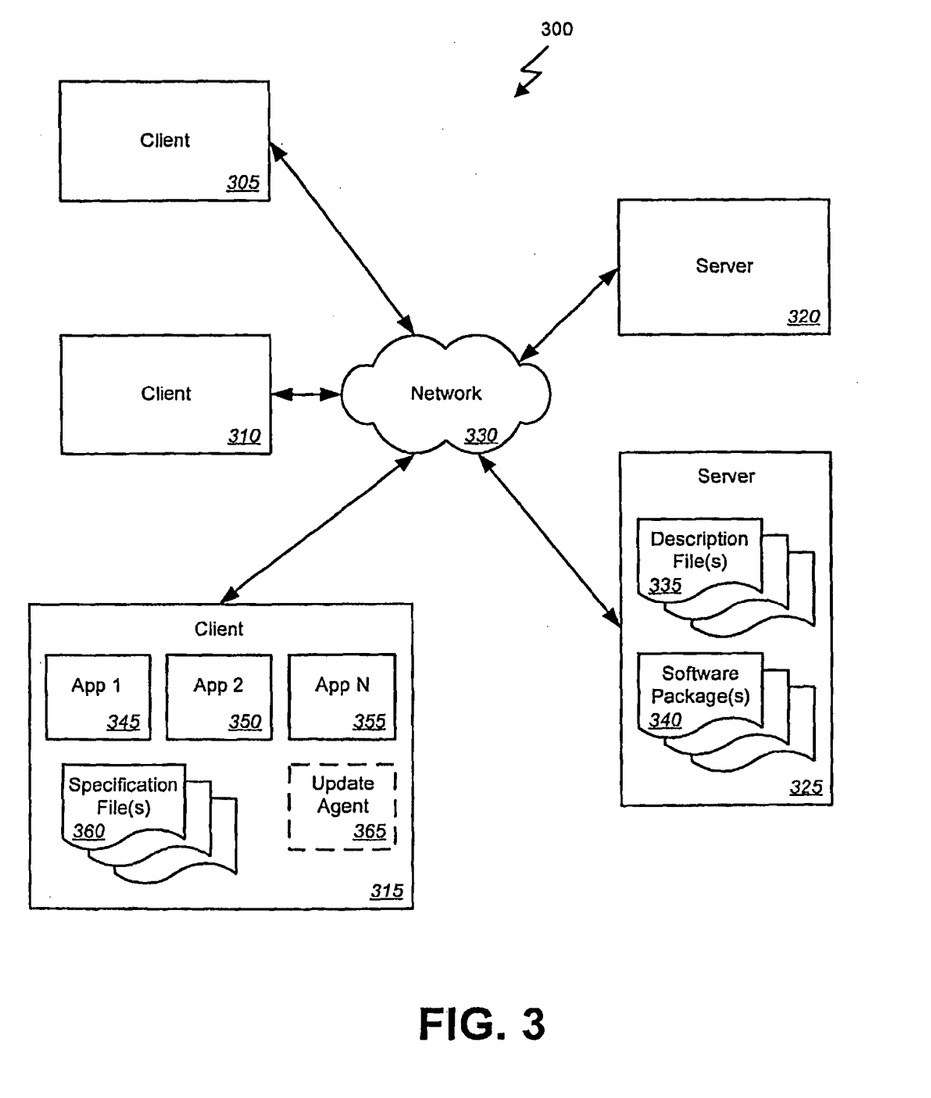
FIG. 3 is a block diagram illustrating functional components of a system for distributing software according to one embodiment of the present invention.

FIG. 3 is a block diagram illustrating functional components of a system for distributing software according to one embodiment of the present invention. In this example, the system 300 includes a number of clients 305-315 and a number of servers 320 and 325 communicatively coupled via a network 330 such as the Internet, an Intranet, or other network as described above. The servers 320 and 325 can be any computer as described above and operated, for example, by one or more software vendors or other entities providing and/or distributing software packages. The clients 305-315 can be any computer as described above and operated, for example, by an end user of a software product distributed by the software vendors or other entities.

One or more of the servers 320 and 325 can be adapted to generate one or more software packages 340 and publish the software packages 340 for access by the clients 305-315. For example, the software packages can be made available through a web page, a web service, an FTP site, or other media accessible by the clients 305-315. In some cases, the server 325 can be further adapted to compress the software package 340. Additionally or alternatively, the server 325 can be further adapted to append a signature to the software package 340.

The server 325 can also generate one or more description files 335 describing each of the software packages 340. For example, the description files 335 can identify the software package 340 to which it relates, identify the contents of the software package 340, identify the uses of the software package 340, etc. In some cases, the server 325 can be adapted to append a signature to the description file 335. Additional details of an exemplary description file 335 will be discussed below with reference to FIG. 6. The description files 335 can also be published by the server 325. That is, the description files 335 can be made available through a web page, a web service, an FTP site, or other media accessible by the clients 305-315.

Importantly, while the media through which the software packages 340 and the description files 335 are made available to the clients 305-315 can be the same, the media may, in some cases, be different. For example, the software packages 340 may be available through an FTP site while the description files 335 are available through a web service or vise versa. Other combinations are contemplated and considered to be within the scope of the present invention. Furthermore, while shown here as being provided by the same server 325, the description files 335 and software packages 340 may be provided by different servers that may be operated by different entities. For example, the software packages 340 may be provided via one or more servers operated by a software vendor while the description files 335 may be provided via a different one or more servers operated by an entity providing an update or download service. Other possible implementations are contemplated and are also considered to be within the scope of the present invention.

The client 315 can optionally have installed thereon an agent 365 adapted to read the description files 335 for the available software packages 340. Alternatively, applications 345-355 installed on the client 315 or the operating system of the client 315 may be adapted to read the description files 335 for the available software packages 340. Therefore, the client 315 and/or agent 365 can read the description files 335 periodically, when triggered by user input, or based on the occurrence of some other event to automatically or upon initiation by a user check for available software packages 340 on one or more servers.

The client 315 can then determine whether the description files 335 indicates one or more of the software packages 340 is available for the client 315. According to one embodiment, the client 315 can be further adapted to verify an origin of the description file 335 based on the signature appended to the description file 335. In such a case, the client 315 can be adapted to determine whether the description file 335 indicates the software package 340 is available for the client 315 only in response to verifying the description file 335. This determination can be based on a comparison of the description file 335 to one or more specification files 360 stored in and/or maintained by the client 315 describing the client 315 and/or related to one or more application 345-355 installed thereon.

For example, a description file 335 can comprise an identifier of an operating system for which a related software package 340 is written. A specification file 360 maintained by the client 315 can include an indication of an operating system of the client 315. In such a case, the client 315 can determine whether the description file 335 indicates the related software package 340 is available for the client 315 by comparing the identifier of an operating system for which the software package 340 is written in the description with the indication of the operating system of the client 315 in the specification file 360. In another example, the description file 335 can additionally or alternatively comprise an identifier of a language for which the related software package 340 is written while the specification file 360 can comprise and indication of one or more languages used on the client 315. In such a case, the client 315 can determine whether the description file 335 indicates the software package 340 is available for the client 315 by comparing the identifier of a language for which the software package 340 is written from the description file 335 with the indication of one or more languages used one the client 315 from the specification file 360.

In response to determining one or more of the software packages 340 is available for the client 315, the client 315 can download the software packages 340. The client can then decompress, if necessary, and install the software package 340. According to one embodiment, the client 315 can be adapted to verify the origin of the software package 340 based on a signature appended to the software package 340. In such a case, decompressing and installing the software packaged 340 can be performed in response to verifying the software package 340.

So, for example, the software package 340 can comprise an update of an application 345 installed on the client 315. In such a case, the description file 335 related to the software package 340 can comprise an identifier of an application the software package 340 updates. Furthermore, the specification file 360 of the client 315 can comprise an indication of applications 345-355 installed on the client 315. In such a case, the client 315 can determine whether the description file 335 indicates the related software package 340 is available for the client 315 by comparing the identifier of the application the software package 340 updates from the description file 335 and the indication of applications 345-355 installed on the client 315 from the specification file 360. Additionally or alternatively, the description file 335 can comprise an identifier of one or more prerequisite updates for installing the software package 340, the specification file 360 can comprise an indications of updates already installed on the client 315 and the client 315 can determine whether the description file 335 indicates the software package 340 is available for the client 315 by comparing the identifier of one or more prerequisite updates from the description file 335 with the indications of updates installed on the client 315 from the specification file 360.

Therefore, based on the information in the description files 335 describing the related software packages 340 and the information from the specification files 360 describing the client and/or application 345-355 installed thereon, the client, possibly via agent 365, can review the software packages 340 and download those software packages determined to be compatible with or otherwise indicated for the client 315. Since the description files 335 can be provided in a format such as HTML, text, or other format compatible with any client and any software package, the client can ready and select between description files 335 related to a variety of software packages potentially from a variety of vendors or other entities.

Figure 4:
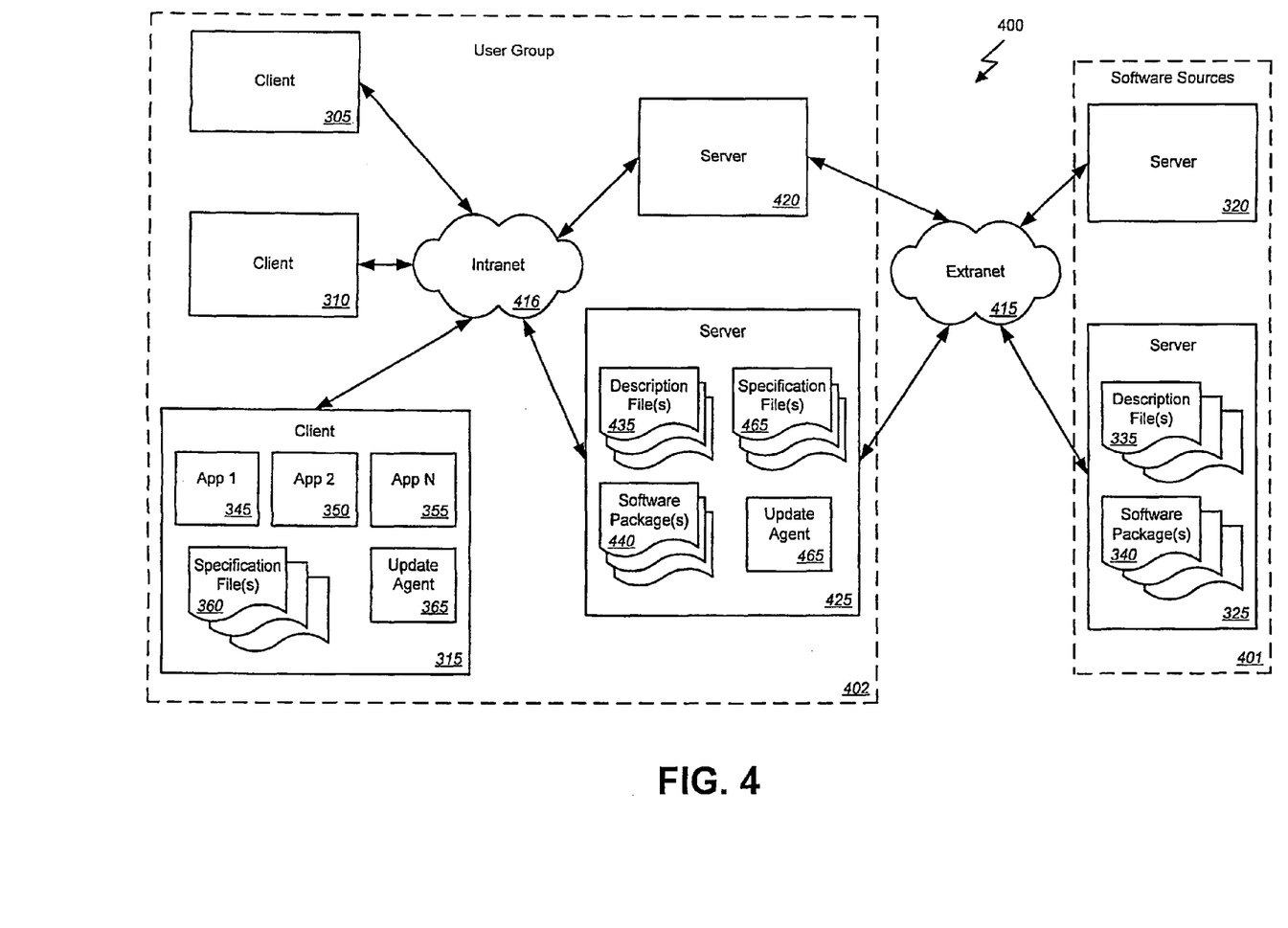
FIG. 4 is a block diagram illustrating functional components of a system for distributing software according to an alternative embodiment of the present invention.

FIG. 4 is a block diagram illustrating functional components of a system for distributing software according to an alternative embodiment of the present invention. This example illustrates a system 400 that may be implemented in a corporation, university, or other large organization to provide updates or other software packages to client computers operated by that organization. The system 400 in this example includes software sources 401 comprising servers 320 and 325 as described above. The clients 305-315 in this example are part of a user group 402 that may be part of a larger organization such as a corporation or university. Furthermore, the user group 402 may include a number of servers 420 and 425.

The servers 420 and 425 of the user group may be communicatively coupled with the software source 401 via an extranet 415 such as the Internet or other network as described above and the clients 305-315 via an intranet 416 or other network also as described above. Generally speaking, one or more servers 420 and 425 of the user group 402 can maintain specification files describing the clients 305-315 of the user group 402. An optional agent 465 of the server 425 can check the description files 335 published by the servers 325 of the software source 401 for available software packages 340 on behalf of the clients 305-315. If identified, the software packages 340 can be downloaded to the server 325 of the user group 402 from the server 325 of the software source 401. The server 425 of the user group can also either download or generate a description file 435 related to the newly downloaded software package 440. The clients 305-315 can then, as described above check for available software packages 440 on the server 425 of the user group 402 rather than directly from the software source 401.

In other words, the server 425 of the user group 402 acts as an intermediary between the clients 305-315 and the servers 320 and 325 of the software source 401 by performing combined functions of the client and server as described above. So, the server 325 of the software source 401 can be adapted to generate a software package 340, publish the software package 340, generate a description file 335 related to the software package 340, where the description file 335 identifies the software package 340, contents of the software package 340, and uses of the software package 340, and publish the description file 335 of the software package 340.

The server 425 of the user group 402 can be adapted to read the description file 335 of the software package 340 from the server 325 of the software source 401 and determine whether the description file 335 indicates the software package 340 is available for one or more of a plurality of clients 305-315 of the user group 402. In response to determining the software package 340 is available for at least one of the plurality of clients 305-315, the server 425 of the user group 402 can download the software package 340, publish the software package 440 to a media accessible by the plurality of clients 305-315, and publish description file 435 of the software package 440 to the media accessible by the plurality of clients 305-315. The description file 435 published by the server 425 of the user group can be downloaded or copied, either as is or with modifications, from the description files 335 from the server of the software source 410 or can be generated by the sever 425 of the user group 402. The clients 315 of the user group 402 can be adapted to read the description file 435 of the software packages 440 from the server 425 of the user group 402, determine whether the description files 435 from the server 425 of the user group 402 indicate a software package 440 is available for the client 315, and in response to determining the software package 440 is available for the client 315, download the software package 440 from the server 425 of the user group 402.

Figure 5:
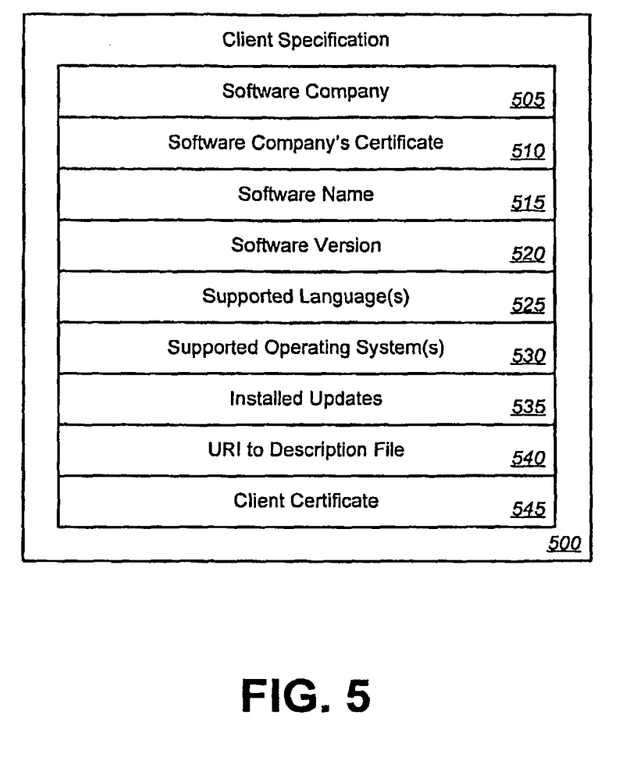
FIG. 5 is a block diagram illustrating exemplary elements that may be included in a client specification according to one embodiment of the present invention.

FIG. 5 is a block diagram illustrating exemplary elements that may be included in a client specification according to one embodiment of the present invention. In this example, the client specification file 500 includes an indication of the software company 505 providing the name of the software company providing a particular application installed on the client with which the specification file 500 is related. The specification file 500 can also include a certificate 510 provided by that company to be used by the client in verifying the origins of a description file and/or a software package. Software name 515 and version 520 elements can identify a name of the application installed on the client to which the specification file relates. The specification file 500 can also include an indication of languages 525 (e.g., English, French, Chinese, etc.) supported by an installed application as well as operating systems 530 supported by the application and/or the client. An installed updates element 535 can list or otherwise identify a number of updates, patches, etc. that have been installed since the original application to which the specification file 500 corresponds was installed. One or more URIs 540 may be included that point to description files related to the application and/or updates that was used by the client when the application or update was originally downloaded. Finally, a client certificate 545 can be included for use in the event that the software company or other entity supplying a software package requires client authentication, authorization, or other verification to download a software module. In such a case, the client can supply the saved certificate 545 from or indicated by the specification file 500.

While various formats may be used to represent the elements 505-545 of the client specification file 500, the elements may, according to one embodiment of the present invention be represented as text, HTML, or other common format that can be read by multiple applications and/or systems. Importantly, it should be noted that the exact format of the client specification file can vary widely depending upon the exact implementation without departing from the scope of the present invention. For example, in some cases, some of the elements shown here may be excluded while in other implementations additional elements may be utilized. In still other cases, the order and/or format of the elements may vary.

Figure 6:
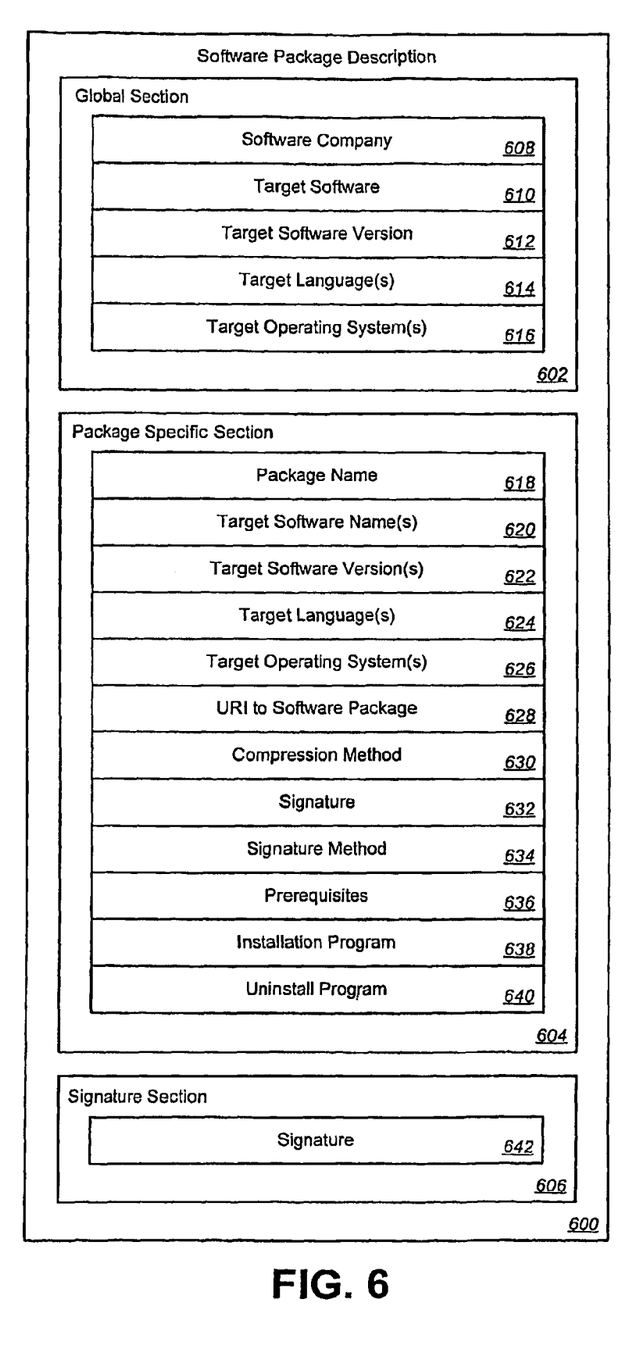
FIG. 6 is a block diagram illustrating exemplary elements that may be included in a software package description according to one embodiment of the present invention.

FIG. 6 is a block diagram illustrating exemplary elements that may be included in a software package description according to one embodiment of the present invention. In this example, the description file 600 includes a global section 602 with elements applying to all or some subset of all software packages on a server, a package specific section 604 with elements applying only or mainly to a specific software package, and a signature section 606.

The global section 602 in this example includes an indication of the software company 608 providing the name of the software company providing a particular software package. The global section 602 can also include a target software name 610 and version 612 identifying a name and version of the application for which the software package related to the description file 600 is intended. The global section 602 can also include an indication of languages 612 (e.g., English, French, Chinese, etc.) as well as operating systems 616 supported by the software package related to the package description 600.

The package specific section 604 in the example of FIG. 6 includes a module name 618 identifying the software package. The package specific section 604 can also include a target software name 620 and version 622 identifying a name and version of the application for which the software package related to the description file 600 is intended. The package specific section 604 can also include an indication of languages 624 (e.g., English, French, Chinese, etc.) as well as operating systems 626 supported by the software package related to the package description 600.

The package specific section 604 can also include a URI directed to or identifying the software package related to the description 600 and identify a compression method 630, if any, used to compress the software package. A signature 632 of the entity supplying the software package as well as an indication of the signature method 634 can be included. The package specific section 604 can indicate one or more prerequisites 636 that should be installed on the client for proper operation of the software package and may also indicate an installation program 638 and an uninstall program 640 to be used by the client for installing and/or uninstalling the software package.

Finally, the signature section 606 can include a signature 642 of an entity supplying the software package.

While various formats may be used to represent the elements of the description file 600, the elements may, according to one embodiment of the present invention be represented as text, HTML, or other common format that can be read by multiple applications and/or systems. Importantly, it should be noted that the exact format of the description file can vary widely depending upon the exact implementation without departing from the scope of the present invention. For example, in some cases, some of the elements shown here may be excluded while in other implementations additional elements may be utilized. In still other cases, the order and/or format of the elements may vary.

Figure 7:
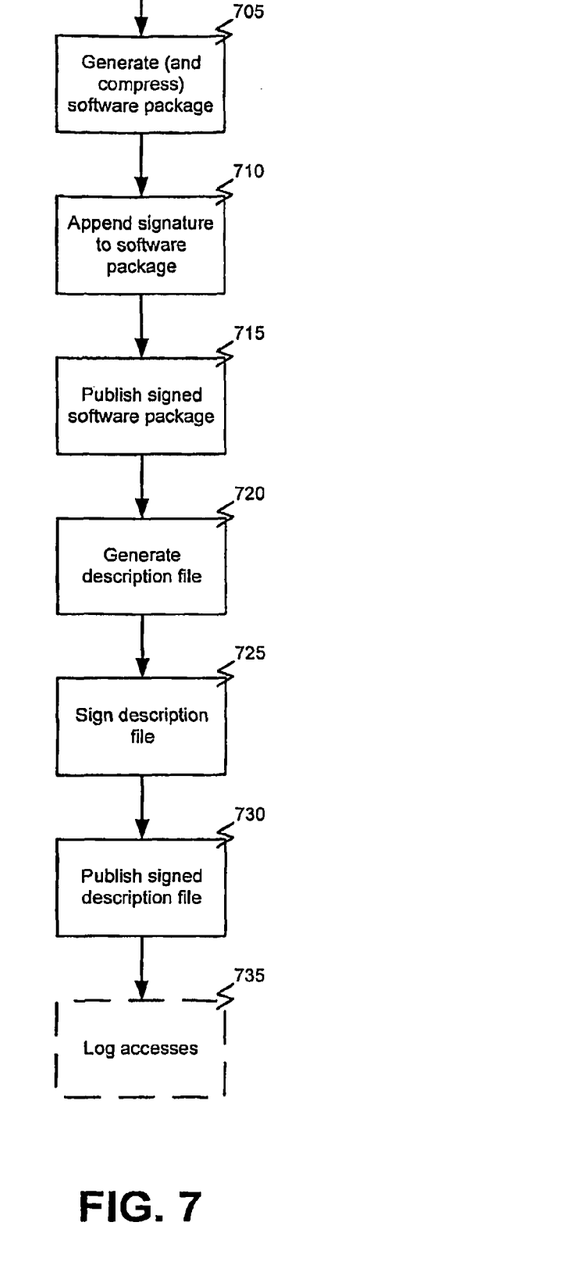
FIG. 7 is a flowchart illustrating a process of providing software to a client according to one embodiment of the present invention.

FIG. 7 is a flowchart illustrating a process of providing software to a client according to one embodiment of the present invention. In this example, processing begins with generating 705 a software package for distribution to the one or more clients. As discussed above, generating 705 the software package can optionally include compressing the software package. Furthermore, in some cases, generating 705 the software package can optionally comprise encrypting the software package with a client certificate. A signature can be appended 710 to the software package. The signature can identify a source of the software package. The software package can be published 715 to a media accessible by the one or more clients. For example, publishing 715 the software package can comprise making the software package available via a first web server. In another example, publishing 715 the software package can comprise writing the software package to a removable media.

A description of the software package can also be generated 720. The description can identify the software package, contents of the software package, and uses of the software package. As discussed above, the description can comprise any or all of an identifier of an operating system for which the software package is written, an identifier of a language for which the software package is written, an Uniform Resource Identifier (URI) for the software package, as well as other possibilities. For example, the software package can comprise an application or an update of an application. In such a case, the description of the software package can comprise an identifier of an application the software package updates. Furthermore, the description can comprise an identifier of one or more prerequisite updates. In some cases, generating the description of the software package can further comprise appending 725 a signature to the description of the software package. The signature can identify a source of the description. As noted above, the source of the software package and the source of the description can be different.

The description of the software package can be published 730 to the media accessible by the one or more clients. For example, publishing 730 the description can comprise making the description available on the first web server or, alternatively, making the description available on a second web server. In another example, publishing 730 the description of the software package can comprise writing the description to the removable media.

According to one embodiment, the method can optionally comprise logging 735 a client access of the software package. Logging 735 can comprise recording an identifier of the software package and an identifier of the client.

Figure 8:
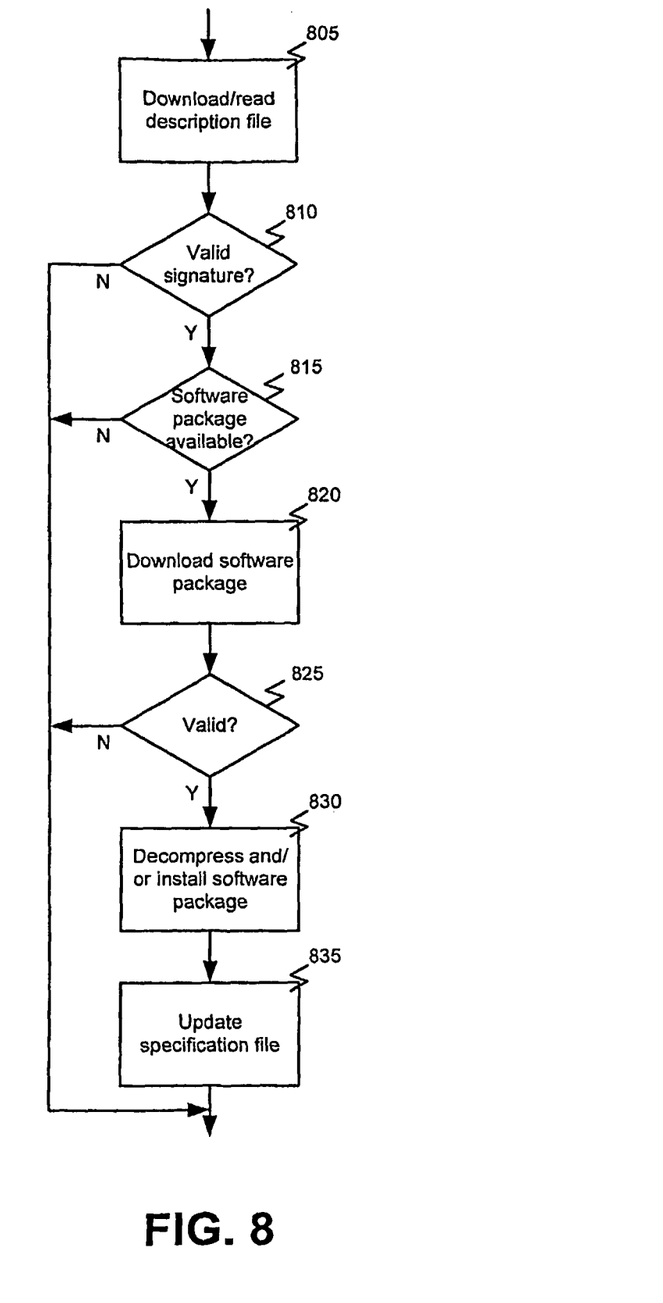
FIG. 8 is a flowchart illustrating a process of obtaining software from a source according to one embodiment of the present invention.

FIG. 8 is a flowchart illustrating a process of obtaining software from a source according to one embodiment of the present invention. In this example, processing begins with a client reading 805 or downloading a description of one or more software packages available on the one or more servers. As noted above, the description can identify the software package, contents of the software package, and uses of the software package. In some cases, the description can comprise an Uniform Resource Identifier (URI) for the software package.

The origin of the description can be verified 810 based on a signature appended to the description. That is, a determination 810 can be made as to whether the signature appended to the signature is valid.

If the signature is valid 810, a determination 815 can be made as to whether the description indicates at least one of the software packages is available for the client. According to one embodiment, determining 815 determining whether the description indicates at least one of the software packages is available for the client can comprise comparing the description to a specification stored on the client. For example, the description can comprise an identifier of an operating system for which the software package is written, the specification can comprise an indication of an operating system of the client, and determining whether the description indicates at least one of the software packages is available for the client can comprise comparing the identifier of an operating system for which the software package is written in the description with the indication of the operating system of the client in the specification. In another example, the description can comprise an identifier of a language for which the software package is written, the specification can comprise an indication of one or more languages used on the client, and determining whether the description indicates at least one of the software packages is available for the client can comprise comparing the identifier of a language for which the software package is written from the description with the indication of one or more languages used one the client from the specification.

According to one embodiment, the software package can comprise an update of an application. In such a case, the description of the software package can comprise an identifier of an application the software package updates, the specification can comprise an indication of applications installed on the client, and determining whether the description indicates at least one of the software packages is available for the client can comprise comparing the identifier of the application the software package updates from the description and the indication of applications installed on the client from the specification. Additionally or alternatively, the description can further comprise an identifier of one or more prerequisite updates for installing the software package, the specification can comprise an indications of updates installed on the client, and determining whether the description indicates at least one of the software packages is available for the client can comprise comparing the identifier of one or more prerequisite updates from the description with the indications of updates installed on the client from the specification.

In response to determining 815 at least one of the software packages is available for the client, the at least one software package can be downloaded 820. According to one embodiment, an origin of the software package can be verified 825 based on a signature appended to the software package. In response to verifying 825 the software package, the software package can be decompressed (if necessary) and installed 830 on the client. In some cases, prior to installing 830 the software package, the software package may be decrypted with, for example, a client certificate. The specification can then be updated 835 to indicate installation of the software package.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing software to one or more clients, the method comprising
    generating by a first server a plurality of software packages for distribution to the one or more clients, wherein the first server comprises a server of a provider of the plurality of software packages;
    publishing the plurality of software packages by the first server to a media accessible by the one or more clients;
    generating by the first server a description of each of the plurality of software packages, each description identifying one of the plurality of software packages, contents of the identified software package, and uses of the identified software package;
    appending a signature to each of the descriptions of the software packages, each signature identifying a source of each of the description;
    publishing the descriptions of the plurality of software packages by the first server to the media accessible by the one or more clients of a user group, wherein the user group comprises a corporation or a university;
    reading by a second server the descriptions of the plurality of software packages from the first server, wherein the second server is a server of the user group and is not a server of the software provider;
    verifying by a second server an origin of each of the descriptions of the plurality of software packages from the first server based on the signature of each of the descriptions;
    in response to verifying the origin of each of the descriptions is valid, determining by the second server whether the descriptions indicate that each of the plurality of software packages is available for a plurality of clients communicatively coupled with the second server based on at least in part on one or more specification files maintained by the second server for each of the plurality of clients;
    in response to determining each of the plurality of software packages is available for the plurality of clients, downloading the plurality of software packages by the second server from the first server, wherein downloading the plurality of software packages by the second server comprises obtaining by the second server from the first server the plurality of software packages and the descriptions, publishing the plurality of software packages by the second server to a media accessible by the plurality of clients, and publishing the descriptions of the plurality of software packages by the second server to the media accessible by the plurality of clients, wherein publishing the plurality of software packages and the descriptions by the second server comprises making the downloaded plurality of software packages available from the second server to the clients.

2. The method of claim 1, wherein generating the plurality of software packages further comprises compressing each of the plurality of software packages.

3. The method of claim 2, further comprising appending by the first server a signature to each of the compressed plurality of software packages the signature identifying a source of the plurality of software packages.

4. The method of claim 3, wherein the source of the plurality of software packages and the source of the descriptions are different.

5. The method of claim 1, wherein publishing the plurality of software packages comprises making the plurality of software packages available via a first web server.

6. The method of claim 5, wherein publishing the descriptions comprises making the descriptions available on the first web server.

7. The method of claim 5, wherein publishing the descriptions comprises making the descriptions available on a second web server.

8. The method of claim 1, wherein publishing the plurality of software packages comprises writing the plurality of software packages to a removable media.

9. The method of claim 8, wherein publishing the descriptions of the software packages comprises writing the descriptions to the removable media.

10. The method of claim 1, wherein each of the descriptions comprises an identifier of an operating system for which the identified software package is written.

11. The method of claim 10, wherein each of the descriptions comprises an identifier of a language for which the identified software package is written.

12. The method of claim 11, wherein each of the descriptions comprises an Uniform Resource Identifier (URI) for the identified software package.

13. The method of claim 1, wherein at least one of the plurality of software packages comprises an update of an application.

14. The method of claim 13, wherein the description of the at least one software package comprises an identifier of an application the at least one software package updates.

15. The method of claim 14, wherein the description of the at least one software package further comprises an identifier of one or more prerequisite updates.

16. The method of claim 1, wherein at least one of the plurality of software packages comprises a new application.

17. The method of claim 1, wherein generating the plurality of software packages further comprises encrypting each of the plurality of software packages with a client certificate.

18. The method of claim 1, further comprising logging a client access of the plurality of software packages by the second server.

19. The method of claim 18, wherein logging comprises recording an identifier of each of the plurality of software packages and an identifier of the client.

20. The method of claim 1, further comprising:
reading, by a client of the plurality of clients, the descriptions of the plurality of software packages from the second server;
determining, by the client, whether the descriptions from the second server indicate one of the plurality of software packages is available for the client; and
in response to determining one of the plurality of software packages is available for the client, downloading, by the client, the determines one of the plurality of software packages from the second server.

21. A system comprising:
a first server comprising a software source for a software provider, the first server adapted to
generate a plurality of software packages,
publish the plurality of software packages,
generate a description of each of the plurality of software packages, each of the descriptions identifying one of the plurality of software packages, contents of the identified software package, and uses of the identified software package,
append a signature to each of the descriptions of the software packages, each signature identifying a source of the each of the description, and
publish the descriptions of the software packages;
a second server communicatively coupled with the first server and adapted to
read the descriptions of the plurality of software packages from the first server,
verify an origin of each of the descriptions based on the signature of each of the descriptions;
in response to verify origin of each of the descriptions is valid, determine whether the descriptions indicate that each of the plurality of software packages is available for a plurality of clients of a user group communicatively coupled with the second server based on at least in part on one or more specification files maintained by the second server for each of the plurality of clients,
in response to determining each of the plurality of software packages is available to the plurality of clients, download the plurality of software packages, wherein downloading the plurality of software packages by the second server comprises obtaining by the second server from the first server the plurality of software packages and the descriptions,
publish the plurality of software packages to a media accessible by the plurality of clients, and publish the descriptions of the software packages to the media accessible by the plurality of clients, wherein the second server is a server of the user group and is not a server of the software provider wherein the user group comprises a corporation or a university, and wherein publishing the plurality of software packages and the descriptions by the second server comprises making the downloaded software packages available from the second server to the clients.

22. The system of claim 21, wherein the first server is further adapted to compress each of the plurality of software packages.

23. The system of claim 22, wherein the first server is further adapted to append a signature to each of the compressed software packages.

24. The system of claim 21, wherein each of the descriptions comprises an identifier of an operating system for which the identified software package is written, and the second server determines whether the description indicates the identified software package is available for a client of the plurality of clients by comparing the identifier of an operating system for which the software package is written in the description with an indication of an operating system of the client m a specification file for the client maintained by the second server.

25. The system of claim 21, wherein each of the descriptions comprises an identifier of a language for which the identified software package is written, and the second server determines whether the description indicates the software package is available for a client of the plurality of clients by comparing the identifier of a language for which the software package is written from the description with an indication of one or more languages used on the client from a specification file for the client maintained by the second server.

26. The system of claim 21, wherein at least one of the descriptions comprises an Uniform Resource Identifier (URI) for the identified software package.

27. The system of claim 21, wherein at least one of the plurality of software packages comprises an update of an application and at least one other of the plurality of software packages comprises a new application.

28. The system of claim 27, wherein the description of each of the software packages comprises an identifier of an application the identified software package updates, and the second server determines whether the description indicates the software package is available for a client of the plurality of clients by comparing the identifier of the application the software package updates from the description and an indication of applications installed on the client from a specification file for the client maintained by the second server.

29. The system of claim 28, wherein the description of each of the software packages further comprises an identifier of one or more prerequisite updates for installing the identified software package, the specification comprises indications of updates installed on the client and the second server determines whether the description indicates the software package is available for the client by comparing the identifier of one or more prerequisite updates from the description with the indications of updates installed on the client from the specification.

30. The system of claim 21, further comprising a client of the plurality of clients adapted to read the descriptions of the plurality of software packages from the second server, determine whether the descriptions from the second server indicate one of the plurality of software packages is available for the client, and in response to determining one of the plurality of software packages is available for the client, download the determines one of the plurality of software packages from the second server.

* * * * *

UNITED STATES PATENT AND TRADEMARK OFFICE
CERTIFICATE OF CORRECTION

| | | |
|---|---|---|
| PATENT NO. | : 8,645,942 B2 | Page 1 of 1 |
| APPLICATION NO. | : 11/577483 | |
| DATED | : February 4, 2014 | |
| INVENTOR(S) | : Maj | |

It is certified that error appears in the above-identified patent and that said Letters Patent is hereby corrected as shown below:

On title page, column 1, under Inventor, line 1, delete "Kamlenna" and insert -- Kamienna --, therefor.

In the Claims

In column 15, line 36, in Claim 1, delete "comprising" and insert -- comprising: --, therefor.

In column 18, line 15, in Claim 24, delete "m" and insert -- in --, therefor.

Signed and Sealed this
Thirtieth Day of June, 2015

Michelle K. Lee
*Director of the United States Patent and Trademark Office*